United States Patent
Glasco et al.

(10) Patent No.: US 8,595,437 B1
(45) Date of Patent: Nov. 26, 2013

(54) COMPRESSION STATUS BIT CACHE WITH DETERMINISTIC ISOCHRONOUS LATENCY

(75) Inventors: David B. Glasco, Austin, TX (US);
Peter B. Holmqvist, Cary, NC (US);
George R. Lynch, Raleigh, NC (US);
Patrick R. Marchand, Apex, NC (US);
Karan Mehra, Cary, NC (US); James Roberts, Austin, TX (US)

(73) Assignee: Nvidia Corporation, Santa Clara, CA (US)

( * ) Notice: Subject to any disclaimer, the term of this patent is extended or adjusted under 35 U.S.C. 154(b) by 1019 days.

(21) Appl. No.: 12/276,147

(22) Filed: Nov. 21, 2008

(51) Int. Cl.
*G06F 12/08* (2006.01)

(52) U.S. Cl.
USPC ............ 711/118; 711/133; 711/120; 711/122

(58) Field of Classification Search
USPC .................................................. 711/118, 133
See application file for complete search history.

(56) References Cited

U.S. PATENT DOCUMENTS

| | | | |
|---|---|---|---|
| 6,795,897 B2 * | 9/2004 | Benveniste et al. ............ | 711/118 |
| 7,769,955 B2 * | 8/2010 | Ozer et al. .................... | 711/138 |
| 2003/0217237 A1 | 11/2003 | Benveniste et al. | |
| 2005/0144388 A1 * | 6/2005 | Newburn et al. .............. | 711/118 |
| 2008/0104329 A1 * | 5/2008 | Gaither et al. ................ | 711/138 |

FOREIGN PATENT DOCUMENTS

KR 1020080047096 5/2008

OTHER PUBLICATIONS

Chi, C.-H.; Dietz, H., "Improving cache performance by selective cache bypass," System Sciences, 1989. vol. 1: Architecture Track, Proceedings of the Twenty-Second Annual Hawaii International Conference on , vol. 1, no., pp. 277-285 vol. 1, Jan. 3-6, 1989.*
GPTO Search Report, GP Appl. No. 102009047200.2, mailed Aug. 16, 2010.
Search Report, GB App. No. 0920627.7, dated Mar. 5, 2010.
KIPO Office Action, KR Appl. No. 10-2009-119078, mailed Mar. 4, 2011. (Attached 2 page translation/summary from Kim & Chang letter dated Mar. 30, 2011).

* cited by examiner

*Primary Examiner* — Sheng-Jen Tsai
*Assistant Examiner* — Ramon A Mercado
(74) *Attorney, Agent, or Firm* — Patterson + Sheridan, L.L.P.

(57) ABSTRACT

One embodiment of the present invention sets forth a compression status bit cache with deterministic latency for isochronous memory clients of compressed memory. The compression status bit cache improves overall memory system performance by providing on-chip availability of compression status bits that are used to size and interpret a memory access request to compressed memory. To avoid non-deterministic latency when an isochronous memory client accesses the compression status bit cache, two design features are employed. The first design feature involves bypassing any intermediate cache when the compression status bit cache reads a new cache line in response to a cache read miss, thereby eliminating additional, potentially non-deterministic latencies outside the scope of the compression status bit cache. The second design feature involves maintaining a minimum pool of clean cache lines by opportunistically writing back dirty cache lines and, optionally, temporarily blocking non-critical requests that would dirty already clean cache lines. With clean cache lines available to be overwritten quickly, the compression status bit cache avoids incurring additional miss write back latencies.

20 Claims, 6 Drawing Sheets

COMPRESSION STATUS BIT CACHE WITH DETERMINISTIC ISOCHRONOUS LATENCY

BACKGROUND OF THE INVENTION

1. Field of the Invention

The present invention generally relates to memory systems and more specifically to a compression status bit cache with deterministic isochronous latency.

2. Description of the Related Art

Performance requirements are constantly increasing in data processing systems, which conventionally comprise one or more processor chips and attached memory devices. Each processor chip includes on-chip data processing resources and memory interface circuitry configured to enable the processing resources to access off-chip, attached memory devices. The processing resources typically include at least one isochronous subsystem, such as a video scan out subsystem configured to drive a display device. An isochronous subsystem generally requires deterministic access to the attached memory devices in order to reliably perform real-time tasks.

To improve overall performance, effective memory bandwidth to the attached memory devices may be increased by storing certain data in a compressed format, which reduces the number of bits needed to represent a block of original data. The amount of memory allocated to store a block of original data in a compressed format may not be not reduced compared to an uncompressed format, but the number of bits needed to store and retrieve the compressed block of data is reduced and therefore memory bandwidth is reduced. A plurality of both loss-less and lossy compressed formats may be used, depending on specific application requirements and whether a specific block of original data is compressible under available compression algorithms.

Each compression format advantageously reduces the number of bits needed to represent a block of original data stored as a compressed block within attached memory. Interpreting bits within the compressed block depends on which compression format, if any, is used to represent the block of original data. A selected compression format associated with each block is indicated by compression status bits for each block of compressible memory. To generate a memory access request that is sized to match a corresponding compressed format, the compressed format needs to be known prior to generating the memory access request. Therefore, a memory request generator circuit configured to generate the memory access request needs to refer to associated compression status bits prior to posting the memory access request to the attached memory.

To maximize performance, the compression status bits should be available to the memory request generator circuit from an on-chip source. A compression status bit cache may be used as an on-chip source of compression status bits for the memory request generator circuit. In normal operation, the compression status bit cache provides compression status bits that may be used to determine a memory access request size. In the event of a miss within the compression status bit cache, a cache line of data corresponding to the cache miss must be loaded by the compression status bit cache. However, to load a new cache line, a clean cache line must be available to be overwritten with the new cache line. If no clean cache line is available, the compression status bit cache must first identify and flush a dirty cache line in a process with no bounded completion time. Without a bounded completion time for compression status bit cache requests, an isochronous subsystem cannot be guaranteed to have deterministic memory access. One solution to this problem is to preclude isochronous subsystems from accessing compressed memory. However, such a restriction unreasonably limits applications from using compressed memory and increases overall bandwidth to attached memory devices.

Accordingly, what is needed in the art is a technique that enables isochronous subsystems to access compressed data within attached memory using a deterministic access regime.

SUMMARY OF THE INVENTION

One embodiment of the present invention sets forth an intermediate cache coupled to one or more isochronous clients and to an external memory and configured to access compressed data and compression information stored in the external memory. The intermediate cache includes a compression status bit cache comprising a request miss buffer and a data store and configured to receive a first memory access request from an isochronous client, determine that compression information for compressed data associated with the first memory access request is not resident, and transmit a request for the compression information for the compressed data from a data cache unit. The intermediate cache also includes the data cache unit configured to determine that the compression information for the compressed data is not resident in response to the request for the compressed information for the compressed data received from the compression status bit cache as well as a memory interface coupled to the compression status bit cache and the data cache unit and configured to transmit the compression information for the compressed data directly to the compression status bit cache, by-passing the data cache unit, where the memory interface receives the compression information for the compressed data from the external memory in response to a request for the compression information transmitted to the external memory by either the compression status bit cache or the data cache unit.

One advantage of the disclosed intermediate cache is that it enables general purpose caching and memory infrastructure to be inexpensively optimized for isochronous memory operations with guaranteed bandwidth and deterministic maximum latency that can coexist with non-isochronous operations.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
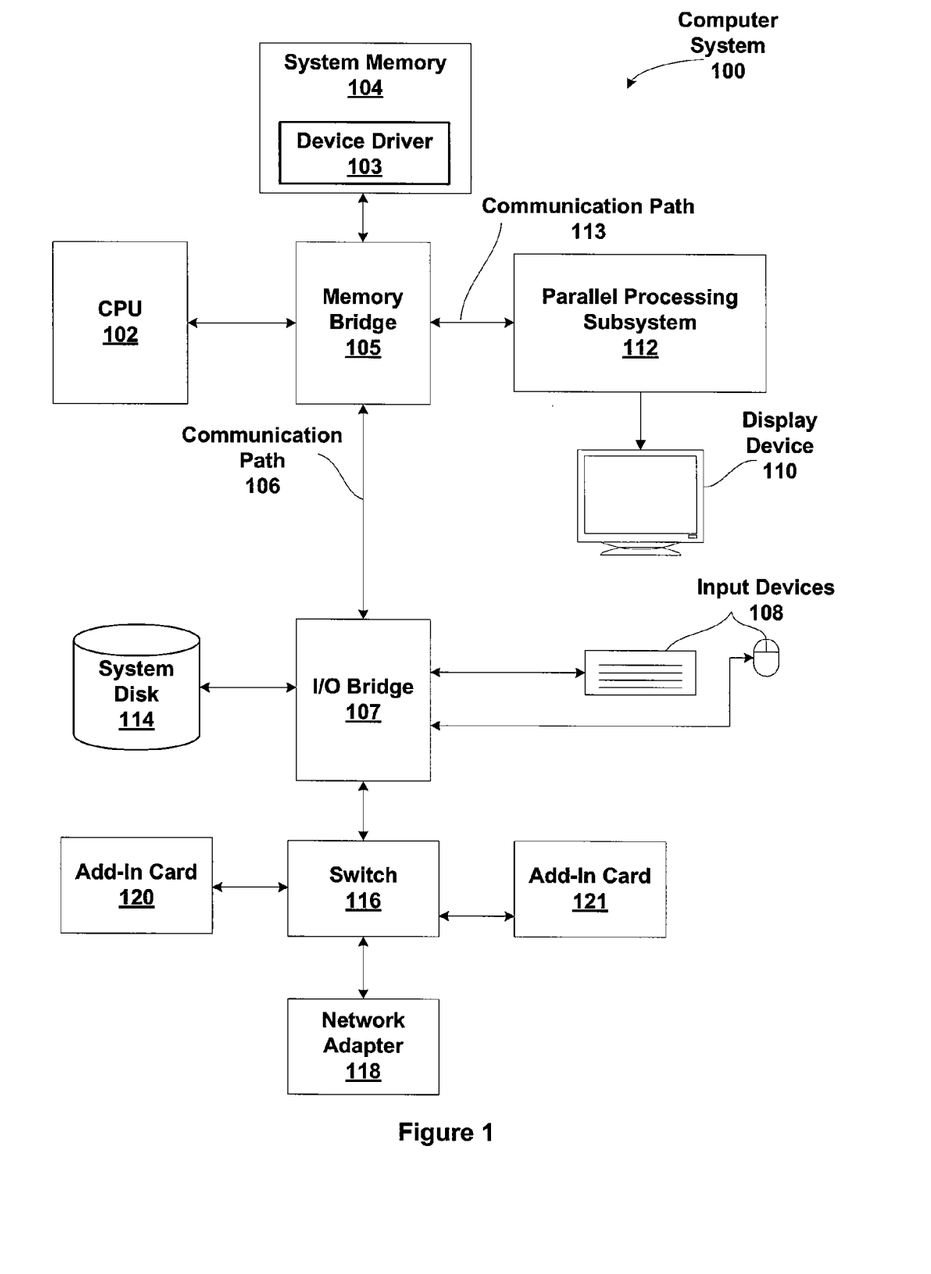
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via a bus path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
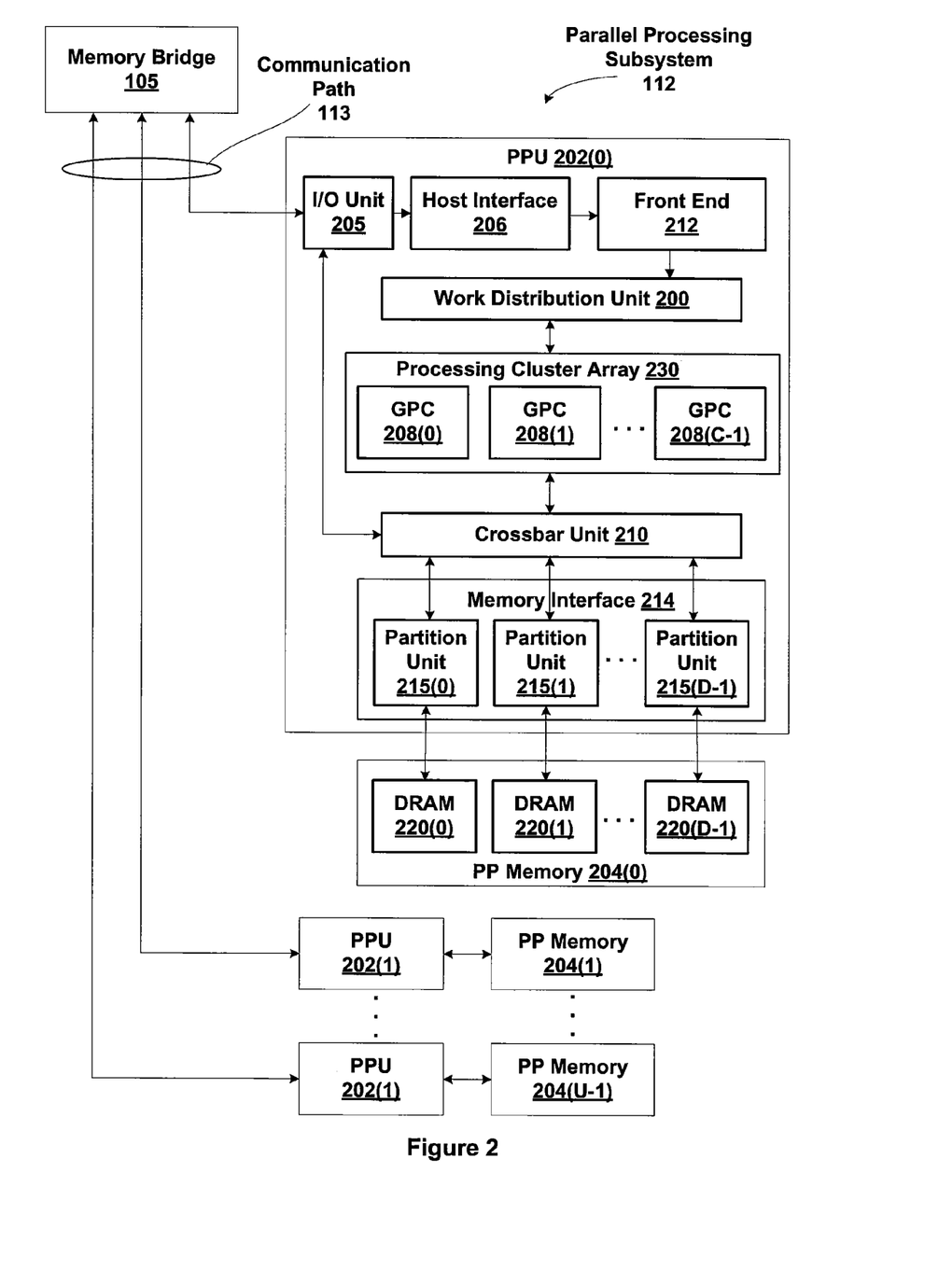
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where $U \geq 1$. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-E link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the partition units 215 within parallel processing memory 204. Crossbar unit 210 is configured to route the output of each GPC 208 to the input of any partition unit 214 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-E) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
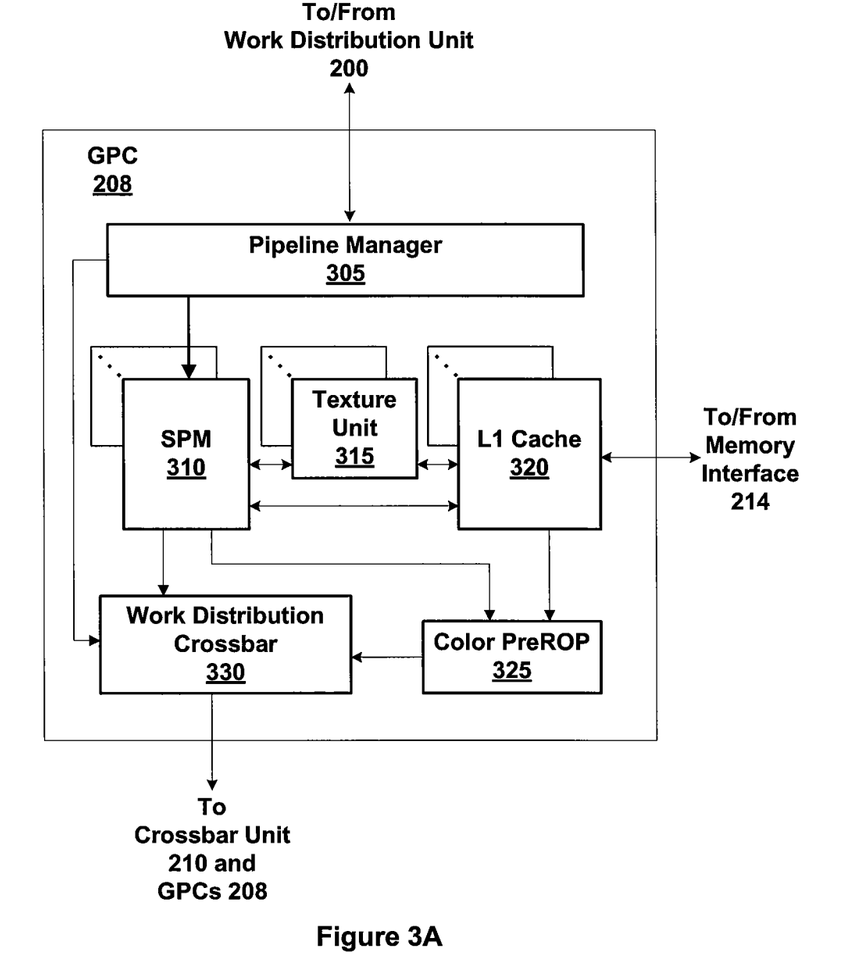
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

In graphics applications, a GPU 208 may be configured to implement a primitive engine 304 for performing screen space graphics processing functions that may include, but are not limited to primitive setup, rasterization, and z culling. In some embodiments, primitive engine 304 is configured to gather pixels into tiles of multiple neighboring pixels before outputting the pixels to L1 cache 320 in order to improve the access efficiency of L1 cache 320. Primitive engine 304 receives a processing task from work distribution unit 200, and when the processing task does not require the operations performed by primitive engine 304, the processing task is passed through primitive engine 304 to a pipeline manager 305. Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional units (e.g., arithmetic logic units, etc.) that may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to GXM thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA"). The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 uses space in a corresponding L1 cache 320 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory.

In graphics applications, a GPC 208 may be configured such that each SPM 310 is coupled to a texture unit 315 for performing texture mapping operations, e.g., determining texture sample positions, reading texture data, and filtering the texture data. Texture data is read from L1 cache 320 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A color preROP (pre-raster operations) 325 is configured to perform optimizations for color blending, organize pixel color data, and perform address translations.

It will be appreciated that the core architecture described herein is illustrative and that variations and modifications are possible. Any number of processing engines, e.g., primitive engines 304, SPMs 310, texture units 315, or color preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing engines, L1 caches 320, and so on.

Figure 3B:
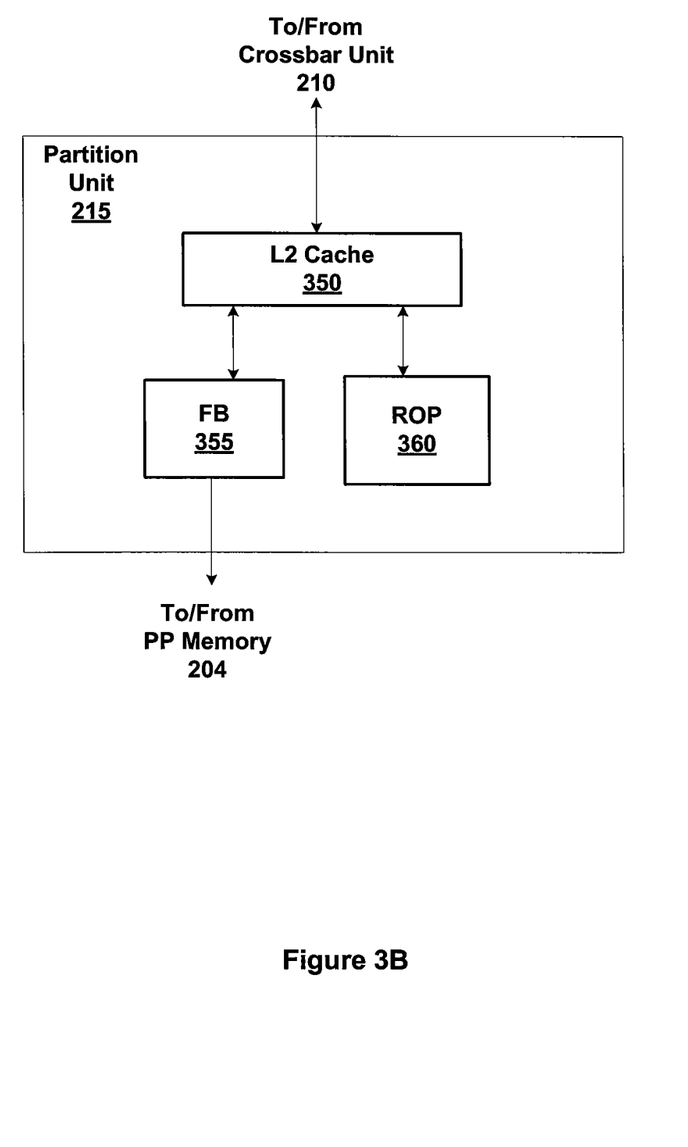
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) 355, and a raster operations unit (ROP) 360. L2 cache 350 is a read/write cache that is configured to perform load and store operations received from crossbar unit 210 and ROP 360. In some embodiments, L2 cache 350 may be split into four (or fewer) slices in order to interface with memory crossbar unit 210 at four times the bandwidth of FB 355. Read misses and urgent writeback requests are output by L2 cache 350 to FB 355 for processing. Dirty updates are also sent to FB 355 for opportunistic processing. FB 355 interfaces directly with parallel processing memory 204, outputting read and write requests and receiving data read from parallel processing memory 204.

In graphics applications, ROP 360 is a processing unit that performs raster operations, such as stencil, z test, and the like, and outputs pixel data as processed graphics data for storage in graphics memory. The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 is configured to compress z or color data that is written to memory and decompress z or color data that is read from memory.

Persons skilled in the art will understand that the architecture described in FIGS. 1, 2, 3A and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Deterministic Latency Compression Status Bit Cache

Figure 4:
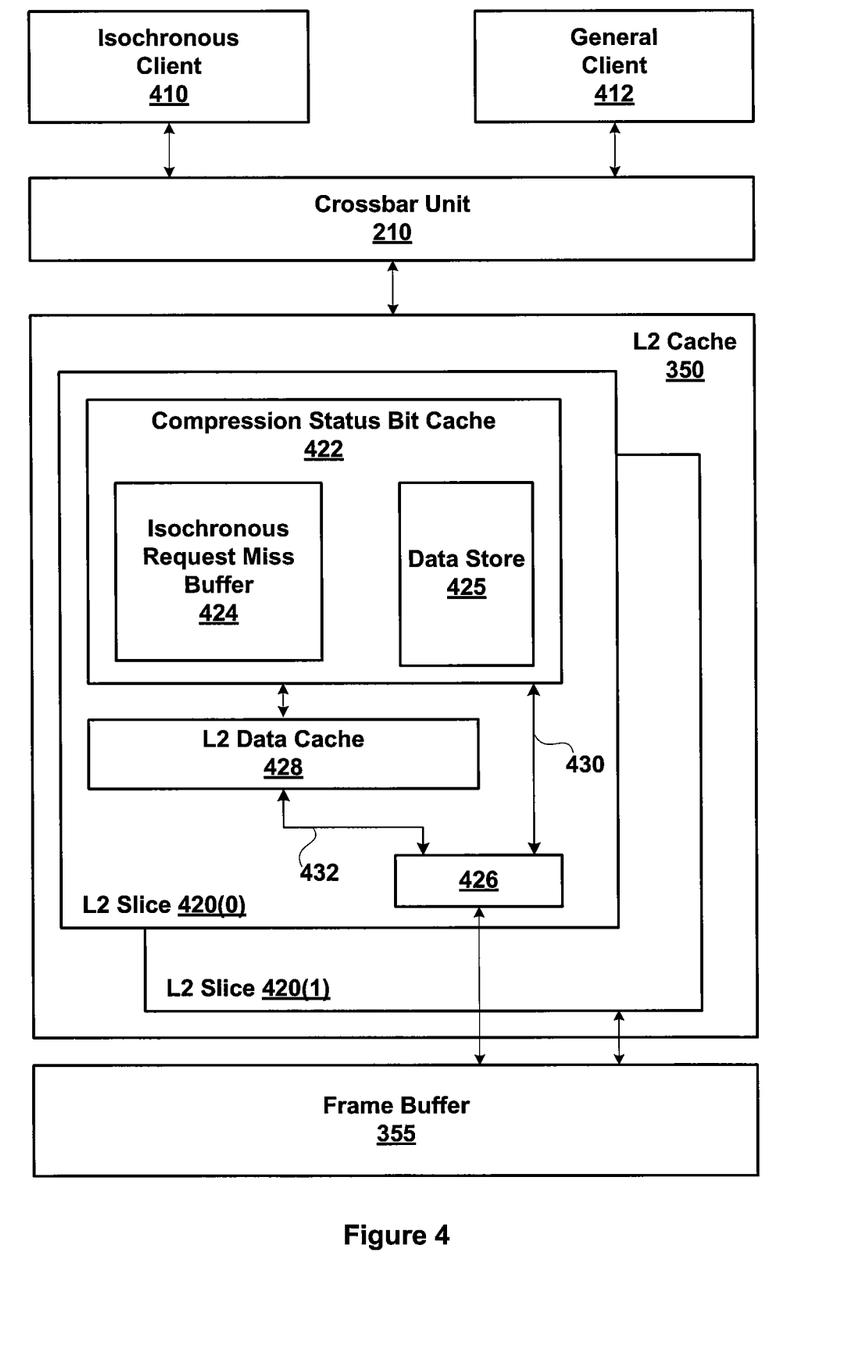
FIG. 4 is a conceptual diagram of a compression status bit cache within the level two (L2) cache, according to one embodiment of the present invention.

FIG. 4 is a conceptual diagram of a compression status bit cache 422 within the level two (L2) cache 350 of FIG. 3B, according to one embodiment of the present invention. The L2 cache 350 comprises one or more L2 slices 420, which may operate independently to perform memory access requests to frame buffer 355. Each memory access request may comprise a read or write operation targeting memory blocks that may be associated with a data surface residing within frame buffer 355. In one embodiment, two L2 slices 420(0) and 420(1) are included in the L2 cache 350.

The L2 cache 350 receives memory access requests from a crossbar unit 210 configured to route memory access requests from an isochronous client 410 and a general client 412. The isochronous client 410 may comprise any data processing unit configured to perform real-time operations, such as a video scan out engine used to drive display device 110 of FIG. 1. The isochronous client 410 performs real-time operations and, therefore, requires deterministic memory access latency and predictable overall memory bandwidth. The general client 412 may be any processing unit that does not specifically require deterministic real-time memory access. GPCs 208 of FIG. 2 comprise one example of a general client. The isochronous client 410 should be given priority over the general client 412 when competing for memory bandwidth.

Each L2 slice 420 within each L2 cache 350 includes a compression status bit cache 422, a frame buffer interface 426, and an L2 data cache 428. The compression status bit cache 422 provides an on-chip cached version of a data structure of compression status bits that are stored in an attached memory, such as DRAM 220 of FIG. 2, which is represented as frame buffer 355. The data structure provides sufficient compression status bit sets to indicate compression status of all compressed memory blocks also residing in the DRAM. Each compression status bit set indicates compression status for a specific corresponding block of memory residing in external DRAM. The compression status bit sets are identified by a compression status bit tag associated with the memory access request, which may include an index corresponding to a physical address that selects a block of data from memory and field selectors that select a specific compression status bit set within the block of memory.

The frame buffer interface 426 enables the L2 data cache 428 and compression status bit cache 422 to communicate with the frame buffer 355. The frame buffer interface 426 communicates with the L2 Data cache 428 via bus 432 and with the compression status bit cache 422 via bus 430.

The L2 data cache 428 provides an on-chip cached version of memory blocks stored within the frame buffer 355. The L2 data cache 428 may operate independently within the L2 cache 350, and independently between L2 slices 420. Each L2 data cache 428 within an L2 slice 420 should only cache memory blocks for the corresponding L2 slice 420, precluding cache coherence problems due to address aliasing.

The compression status bit cache 422 is organized to store cache lines of the data structure, wherein each cache line includes a plurality of compression status bit sets. One or more cache lines are organized into a cache data store 425, disposed within the compression status bit cache 422. If a compression status bit set associated with a memory access request from a memory client is not currently stored in the cache data store, then a compression status bit cache miss is generated. In response to a compression status bit cache miss, the compression status bit cache 422 generates a memory access request to access the data structure by retrieving a cache line that includes the requested compression status bit set. If a compression status bit set associated with the memory access request from the memory client is currently stored in the cache data store, then the compression status bit cache 422 responds with the corresponding compression status bit set, which may then be used by the L2 data cache 428 to further process the memory client request.

In one embodiment, two bits comprise one compression status bit set, wherein each compression status bit set can assume one of four code values given by the two bits. One code value may be used to indicate that a corresponding block of memory is not compressed, while each of the remaining three code values may indicate one of three different compression formats.

Under normal operation, a memory access request to a memory block passes through the compression status bit cache 422 in order to determine compression status for the requested memory block. The memory access request is forwarded to the L2 data cache 428 along with an associated compression status bit set used to potentially generate a request to the frame buffer 355. A cache hit in the L2 data cache 428 may be processed locally, with a corresponding read or write operation being completed by the L2 data cache 428. A cache miss in the L2 data cache 428 results in a memory access request being generated and posted to the frame buffer 355. In one embodiment, one cache line comprises one memory block.

Importantly, if the L2 data cache 428 misses, a reduced set of data comprising a compressed representation of a corresponding cache line needs to be requested by the L2 data cache 428. The amount of data requested by the L2 data cache 428 is established by the corresponding compression status bit set provided by the compression status bit cache 422. By reducing a memory request size for compressed memory blocks, overall bandwidth demanded of on PP memory 204 is reduced. Any technically feasible replacement policy and association mechanism may be used within the L2 data cache 428.

Certain memory clients are compression aware and are able to directly read and write compressed data. Other clients are compression naïve and are not able to process compressed data directly. For example, the GPCs 208 of FIG. 2 are generally not equipped to process compressed data. If a compression aware memory client requests a read or write operation to a compressed block of memory, the L2 cache 350 may allow the client to operate with compressed data. If, however, a compression naïve memory client requests a read from a compressed block of memory, the L2 cache 350 decompresses data within the compressed block of memory and returns decompressed data to the compression naïve memory client. In certain instances, a compression naïve memory client may only write uncompressed data back to any given block of memory. If a compression aware memory client later writes the same block of memory, the block may be written in a compressed format if appropriate.

The compression status bit cache 422 includes an isochronous request miss buffer 424 configured to queue compression status bit cache request misses associated with isochronous memory clients, such as isochronous client 410. Each request from the isochronous client 410 that generates a hit within the compression status bit cache 422 causes the compression status bit cache 422 to produce a compression status bit set for a corresponding memory access request.

In one embodiment, if the compression status bit cache 422 encounters a read miss, then the compression status bit cache 422 loads a new cache line from one of two different data paths, depending on which type of memory client produced a memory access request that resulted in the cache miss. If a general client 412 generates a memory access request that results in a cache miss in the compression status bit cache 422 then a cache line implicated by the cache miss is read from the L2 data cache 428, which in turn, may read the cache line from the frame buffer 355 via bus 432. If the isochronous client 410 generates a memory access request that results in a cache miss in the compression status bit cache 422 (referred to herein as an isochronous status bit cache miss), a cache line implicated by the cache miss may be read from the L2 data cache 428 if the cache line is available from the L2 data cache 428. If the cache line is not available from the L2 data cache 428, then a read request is transmitted to the frame buffer 355. Read data returned from the frame buffer 355 is transmitted directly to the compression status bit cache 422 via bus 430, bypassing the L2 data cache 428 and eliminating any associated miss latency. In an alternative embodiment, the compression status bit cache 422 bypasses the L2 data cache 428 to service a read miss regardless of the type of memory client.

Compression status bit latency defines a time delay between when a memory access request queries the compression status bit cache 422 and when the corresponding compression status bit set is available. In general, the worst-case theoretical latency scenario involves a miss in the compression status bit cache 422 followed by a miss in the L2 data cache 428, where no clean cache lines are available to store the missing cache line. In this scenario, each cache miss forces the respective cache to select and flush a dirty cache line to make room for the missing cache line. Allowing read data from the frame buffer 355 to bypass the L2 data cache 428 following an isochronous status bit cache read miss means that any compression status bit latency is dominated by latency in the compression status bit cache 422 and latency associated with reading the frame buffer 355. Furthermore, if clean cache lines are always available within the compression status bit cache 422, then the compression status bit latency is deterministic, and dominated by the latency associated with reading the frame buffer 355. To assure that clean cache lines are always available within the compression status bit cache 422, dirty lines are opportunistically written back to the frame buffer 355 to maintain at least a certain minimum threshold of clean cache lines that may be immediately overwritten in the event of a compression status bit cache miss. The minimum threshold is generally a function of the latency associated with reading the frame buffer 355 and generally characterized by a maximum number of cache line fill requests that may be in flight during this latency. An isochronous client, such as a video scan out subsystem, typically accesses memory in a predictable pattern, allowing each cache line fill to be operative over many requests to the compression status bit cache 422, which in turn provides the compression status bit cache 422 with ample time to write dirty cache lines an maintain the minimum threshold of clean cache lines.

In one embodiment, a first threshold initiates cleaning of dirty cache lines from the compression status bit cache 422 until a certain minimum number of clean cache lines are available. A second threshold blocks write requests from non-isochronous clients to clean cache lines within the compression status bit cache 422. Each threshold is triggered when the compression status bit cache 422 stores a certain number of dirty cache lines. By combining the effect of both thresholds, the compression status bit cache 422 can guarantee that a certain minimum number of clean cache lines are always available to isochronous clients.

In one embodiment, the compression status bit cache 422 writes cache lines back to the frame buffer 355 via the L2 data cache 428. The compression status bit cache 422 may use a fully associative tag scheme to maximize tag utilization while maintaining at least a certain minimum number of clean cache lines.

Figure 5:
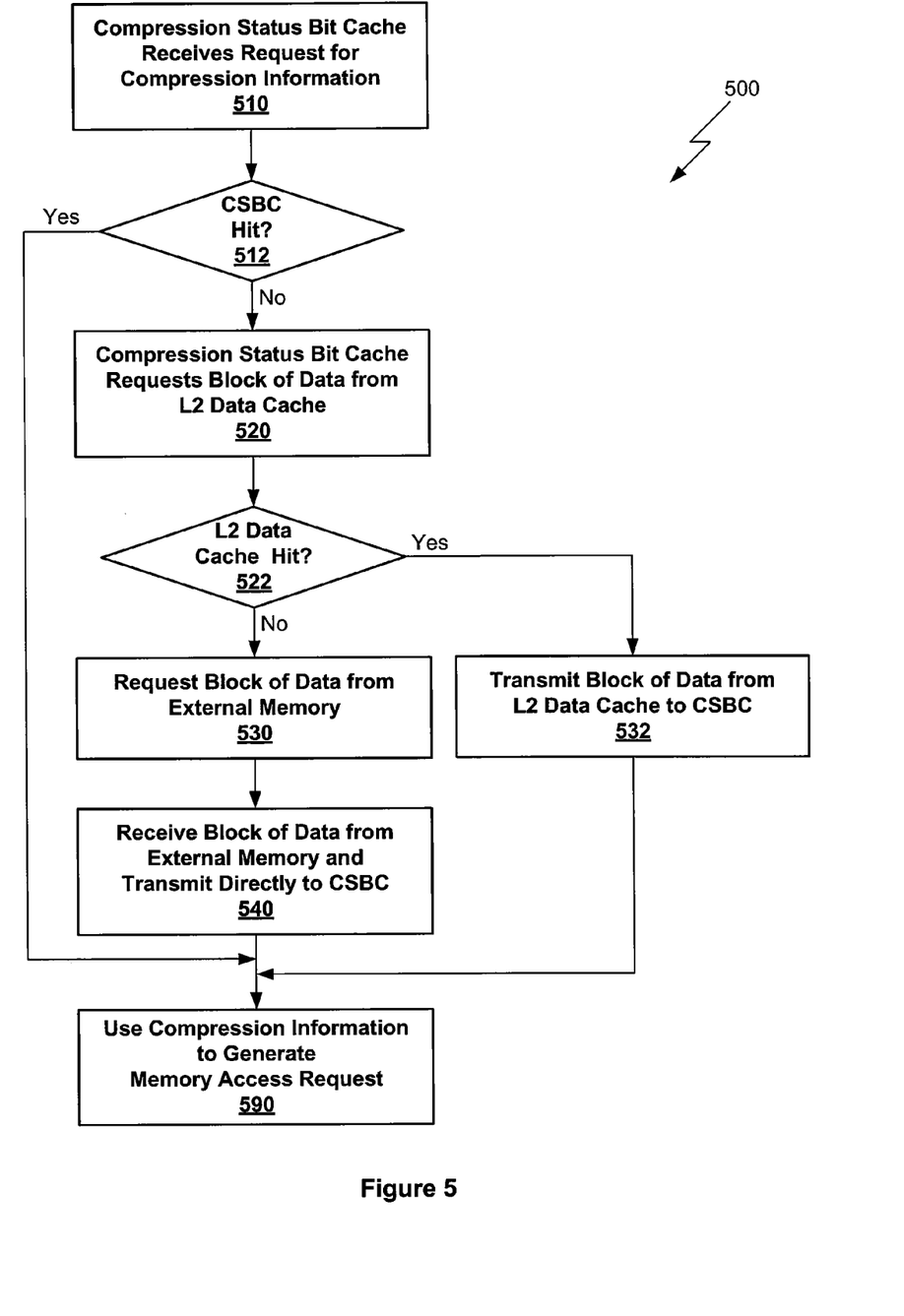
FIG. 5 is a flow diagram of method steps for deterministically reading compression information from the compression status bit cache, according to one embodiment of the invention.

FIG. 5 is a flow diagram of method steps 500 for deterministically reading compression information from the compression status bit cache 422, according to one embodiment of the invention. Although the method steps are described in conjunction with the systems of FIGS. 1-4, persons skilled in the art will understand that any system configured to perform the method steps, in any order, is within the scope of the invention.

The method begins in step 510, where the compression status bit cache (CSBC) receives a request for compression information, such as a compression status bit set. If, in step 512, the requested compression information resides in the CSBC, then the request results in a CSBC hit and the method proceeds to step 590. The method terminates in step 590, where the compression information is used to generate a memory access request for compressed data to external memory. The memory access request should be reduced in size according to the compression information.

Returning to step 512, if the requested compression information does not reside in the CSBC, then the request results in a CSBC miss and the method proceeds to step 520, where the CSBC requests a block of data corresponding to the compression information from the L2 data cache. The requested compression information is identified using an address within an address space, such as a physical address space. In one embodiment, the address is a physical address.

If, in step 522, the requested compression information resides in the L2 data cache, then the request results in an L2 data cache hit and the method proceeds to step 532, where the L2 data cache transmits the requested compression information to the CSBC. The method then proceeds to step 590.

Returning to step 522, if the requested compression information does not reside in the L2 data cache, then the request results in an L2 data cache miss and the method proceeds to step 530. In step 530, the requested compression information is requested from external memory. In one embodiment, the L2 data cache 428 generates the request to external memory; the request is marked so that the frame buffer interface 426 transmits the requested data directly to the compression status bit cache 422. In an alternative embodiment, the compression status but cache 422 generates the request to external memory and the frame buffer interface 426 transmits the requested data directly to the compression status bit cache 422.

In step 540, the requested compression information corresponding to the CSBC miss is received from external memory and transmitted directly to the CSBC. The method then proceeds to step 590.

In sum, a compression status bit cache with deterministic latency is disclosed. The compression status bit cache includes an isochronous request miss buffer used to queue compression staus bit cache misses, are routed directly to frame buffer memory, thereby eliminating read latency associated with an L2 data cache in a worst case scenario. A minimum threshold of free cache lines within the compression status bit cache is maintained by opportunistically writing back cache lines to preserve a pool of clean cache lines that may be overwritten immediately in the event of a miss. One advantage of the present invention is that general purpose caching and memory infrastructure may be inexpensively optimized to enable deterministic, isochronous memory operations to coexist with non-isochronous operations.

Persons skilled in the art will readily recognize that the compression status bit cache may be implemented as customized fixed-function hardware or as a software program executing on an appropriately configured hardware system. Further, embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

We claim:

1. An intermediate cache coupled to one or more isochronous clients, one or more general clients, and to an external memory and configured to access compressed data and compression information stored in the external memory, the intermediate cache comprising:

a compression status bit cache comprising a request miss buffer and a data store and configured to:

receive a first memory access request from the one or more isochronous clients or the one or more general clients, determine that compression information for compressed data associated with the first memory access request is not resident, and transmit a request for the compression information for the compressed data from a data cache unit;

the data cache unit configured to determine that the compression information for the compressed data is not resident in response to the request for the compression information for the compressed data received from the compression status bit cache; and a memory interface coupled to the compression status bit cache and the data cache unit and configured (i) to transmit the compression information for the compressed data directly to the compression status bit cache bypassing the data cache unit when the first memory access request is received from an isochronous client, or (ii) to transmit the compression information to the data cache unit when the first memory access request is received from a general client, wherein the memory interface receives the compression information for the compressed data from the external memory in response to a request for the compression information transmitted to the external memory by either the compression status bit cache or the data cache unit.

2. The intermediate cache of claim 1, wherein the data cache unit is further configured to request the compression information for the compressed data from the external memory in response to the request received from the compression status bit cache.

3. The intermediate cache of claim 1, wherein the compression status bit cache is configured to request the compression information for the compressed data from the external memory upon the determination that the compression information is not resident in the data cache unit.

4. The intermediate cache of claim 1, wherein the data store is configured to include a plurality of cache lines, and each cache line is configured to store compression information associated with the compressed data residing in the external memory.

5. The intermediate cache of claim 4, wherein the compression status bit cache is further configured to maintain a specific minimum number of clean cache lines in the data store.

6. The intermediate cache of claim 5, wherein the compression status bit cache is configured to block write requests from the general client when the number of clean cache lines in the data store is lower than a threshold.

7. The intermediate cache of claim 1, wherein the compression status bit cache includes a request miss buffer that stores the request for the compression information for the compressed data reflecting the determination that the compression information is not resident in the data store, and the request miss buffer is configured to transmit the request for the compression information to the data cache unit.

8. The intermediate cache of claim 1, wherein the compression status bit cache is configured to transmit the compression information for the compressed data received from the memory interface to the data cache unit.

9. The intermediate cache of claim 8, wherein the data cache unit is configured to request the compressed data from the external memory based on the compression information received from the compression status bit cache.

10. A computing device, comprising:

one or more isochronous clients;

one or more general clients;

an intermediate cache configured to access compressed data and compression information stored in an external memory and including:
   a compression status bit cache comprising a request miss buffer and a data store and configured to:
      receive a first memory access request from the one or more isochronous clients or the one or more general clients,
      determine that compression information for compressed data associated with the first memory access request is not resident, and
      transmit a request for the compression information for the compressed data from a data cache unit,
   the data cache unit configured to determine that the compression information for the compressed data is not resident in response to the request for the compressed information for the compressed data received from the compression status bit cache, and
   a memory interface coupled to the compression status bit cache and the data cache unit and configured (i) to transmit the compression information for the compressed data directly to the compression status bit cache by-passing the data cache unit when the first memory access request is received from an isochronous client, or (ii) to transmit the compression information to the data cache unit when the first memory access request is received from a general client, wherein the memory interface receives the compression information for the compressed data from the external memory in response to a request for the compression information transmitted to the external memory by either the compression status bit cache or the data cache unit;
the external memory coupled to the intermediate cache; and
a crossbar unit that couples the one or more isochronous clients to the intermediate cache.

11. The computing device of claim 10, wherein the data cache unit is further configured to request the compression information for the compressed data from the external memory in response to the request received from the compression status bit cache.

12. The computing device of claim 10, wherein the compression status bit cache is configured to request the compression information for the compressed data from the external memory upon the determination that the compression information is not resident in the data cache unit.

13. The computing device of claim 10, wherein the data store is configured to include a plurality of cache lines, and each cache line is configured to store compression information associated with the compressed data residing in the external memory.

14. The computing device of claim 13, wherein the compression status bit cache is further configured to maintain a specific minimum number of clean cache lines in the data store.

15. The computing device of claim 14, wherein the compression status bit cache is configured to block write requests from the general client when the number of clean cache lines in the data store is lower than a threshold.

16. The computing device of claim 10, wherein the compression status bit cache includes a request miss buffer that stores the request for the compression information for the compressed data reflecting the determination that the compression information is not resident in the data store, and the request miss buffer is configured to transmit the request for the compression information to the data cache unit.

17. The computing device of claim 10, wherein the compression status bit cache is configured to transmit the compression information for the compressed data received from the memory interface to the data cache unit.

18. The computing device of claim 17, wherein the data cache unit is configured to request the compressed data from the external memory based on the compression information received from the compression status bit cache.

19. A method for retrieving compressed data stored in an external memory based on compression information also stored in the external memory, the method comprising:
   receiving a first memory access request for the compressed data stored in the external memory, wherein the first request is generated by an isochronous client or by a general client;
   determining that compression information for compressed data is not resident in a compression status bit cache;
   determining that the compression information for the compressed data is also not resident in a data cache unit;
   requesting the compression information for the compressed data from the external memory;
   receiving the compression information for the compressed data from the external memory;
   transmitting the compression information for the compressed data directly to a data store within the compression status bit cache by-passing the data cache unit when the first memory access request is received from the isochronous client; or
   transmitting the compression information for the compressed data to the data cache unit when the first memory access request is received from the general client; and
   transmitting to the external memory a second memory access request for the compressed data based on the compression information for the compressed data.

20. The method of claim 19, further comprising the step of transmitting the compression information for the compressed data from the data store to the data cache unit prior to the step of transmitting the second memory access request to the external memory.

* * * * *